(12) United States Patent
Klotz et al.

(10) Patent No.: US 11,086,012 B2
(45) Date of Patent: Aug. 10, 2021

(54) METHOD AND SYSTEM FOR RECOGNIZING OBJECTS USING ULTRASONIC SIGNALS

(71) Applicant: Robert Bosch GmbH, Stuttgart (DE)

(72) Inventors: Albrecht Klotz, Leonberg (DE); Dirk Schmid, Simmozheim (DE); Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 16/477,774

(22) PCT Filed: Dec. 11, 2017

(86) PCT No.: PCT/EP2017/082262
§ 371 (c)(1),
(2) Date: Jul. 12, 2019

(87) PCT Pub. No.: WO2018/137834
PCT Pub. Date: Aug. 2, 2018

(65) Prior Publication Data
US 2019/0369238 A1    Dec. 5, 2019

(30) Foreign Application Priority Data
Jan. 26, 2017  (DE) .......................... 102017201219.6

(51) Int. Cl.
*G01S 15/10*  (2006.01)
*G01S 15/93*  (2020.01)
(Continued)

(52) U.S. Cl.
CPC ........ *G01S 15/102* (2013.01); *G01S 7/52006* (2013.01); *G01S 7/53* (2013.01);
(Continued)

(58) Field of Classification Search
CPC ...... G01S 15/102; G01S 7/52006; G01S 7/53; G01S 7/539; G01S 15/931; G01S 2015/932; G01S 15/10; G01S 7/52004; G01S 7/533
(Continued)

(56) References Cited

U.S. PATENT DOCUMENTS 4,032,913 A * 6/1977 Okamura ................ H03M 7/30
341/138

FOREIGN PATENT DOCUMENTS

DE         10146095 A1   4/2003
DE     102006053267 A1   5/2008
(Continued)

OTHER PUBLICATIONS

English translation of Description of Faber et al., DE 102007042220), 39 pp. (Year: 2021).*
(Continued)

*Primary Examiner* — Daniel L Murphy
(74) *Attorney, Agent, or Firm* — Norton Rose Fulbright US LLP; Gerard Messina

(57) ABSTRACT

A method for operating an ultrasonic measuring device, encompassing the steps of receiving echo amplitudes, ascertaining object distances for the received echo amplitudes, computing normalized echo amplitudes for the received echo amplitudes, a received echo amplitude with a certain object distance being divided by a reference echo amplitude for the same or a similar object distance, encoding the normalized echo amplitudes, and transmitting the encoded echo amplitudes to a control unit. Also described is a related computer program, a system for carrying out the method, and a vehicle that includes a driving assistance system.

10 Claims, 2 Drawing Sheets

(51) Int. Cl.
  *G01S 7/52* (2006.01)
  *G01S 7/53* (2006.01)
  *G01S 7/539* (2006.01)
  *G01S 15/931* (2020.01)

(52) U.S. Cl.
  CPC ............ *G01S 7/539* (2013.01); *G01S 15/931* (2013.01); *G01S 2015/932* (2013.01)

(58) Field of Classification Search
  USPC .......................................................... 367/99
  See application file for complete search history.

(56) References Cited

FOREIGN PATENT DOCUMENTS

| | | |
|---|---|---|
| DE | 102007042220 A1 | 3/2009 |
| DE | 102010041424 A1 | 3/2012 |
| EP | 1643271 A1 | 4/2006 |
| EP | 1923717 A1 | 5/2008 |

OTHER PUBLICATIONS

English translation of Description of Danz et al., EP 1643271, 30 pp. (Year: 2021).*
English translation of Description of Gotzig et al. DE 102006053267, 18 pp. (Year: 2021).*
International Search Report for PCT/EP2017/082262, dated May 4, 2018.
Machine translation of DE3100479A1.

* cited by examiner

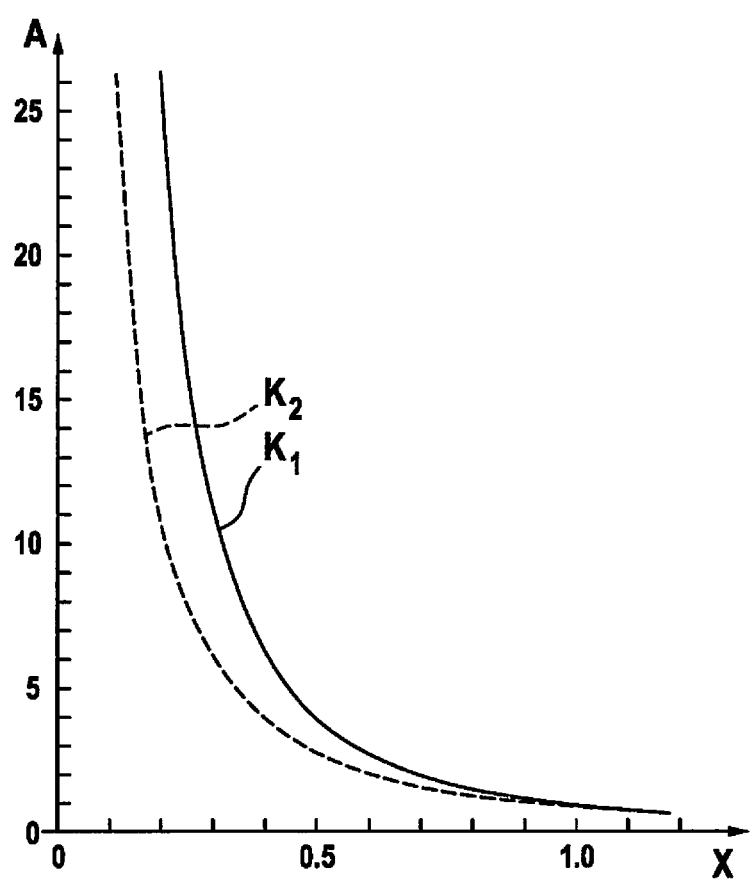

METHOD AND SYSTEM FOR RECOGNIZING OBJECTS USING ULTRASONIC SIGNALS

FIELD OF THE INVENTION

The present invention relates to a method for recognizing objects using ultrasonic signals. Moreover, a computer program and a system for carrying out the method are provided, as well as a vehicle with a driving assistance system that includes such a system.

BACKGROUND INFORMATION

Recent vehicles are equipped with numerous driving assistance systems which, with the aid of data about the surroundings of the vehicle, assist the driver in carrying out various driving maneuvers. To perform their tasks, such driving assistance systems may require an accurate depiction of the surroundings of the vehicle. The depiction of the surroundings of the vehicle is provided using various sensors, for example with the aid of ultrasonic sensors. By use of the ultrasonic sensors, a signal is emitted whose echo, upon reflection on an obstruction, is recorded at the vehicle by the ultrasonic sensors, i.e., the same sensor or a sensor that is different from the emitting sensor. The distance between the vehicle and the reflecting obstruction may be computed based on the time that has elapsed between emitting and receiving the signal, and the known propagation speed of the signal.

Ultrasonic sensors have a visual field within which they may detect obstructions. The sensitivity of the ultrasonic sensors decreases toward the edge of their visual field.

A device for processing ultrasonic signals is discussed in DE 31 00 479 C2, the device including an ultrasonic oscillator for emitting an ultrasonic pulse to a workpiece and for detecting errors or defects in the workpiece. A reflected echo signal is received and converted in an analog/digital converter. Since the amplitude of the echo signals decreases due to the propagation distance, the amplitude is corrected to a fixed peak value in discrete steps according to an amplitude correction curve.

SUMMARY OF THE INVENTION

The object of the present invention is to not only determine the distance of objects from a transceiver unit, but also to recognize or at least check the plausibility of the objects, using ultrasonic signals.

According to a first aspect of the present invention, a method for operating an ultrasonic measuring device is provided, encompassing the steps of receiving echo amplitudes, ascertaining object distances for the received echo amplitudes, computing normalized echo amplitudes for the received echo amplitudes, a received echo amplitude with a certain object distance being divided by a reference echo amplitude for the same or a similar object distance, encoding the normalized echo amplitudes, and transmitting the encoded echo amplitudes to a control unit.

For this purpose, pulse echo measurements are carried out during operation of the ultrasonic transceiver unit pulse, ultrasonic signals being emitted with the aid of an ultrasonic sensor, and echoes of objects in the surroundings being received by the same ultrasonic sensor or by an ultrasonic sensor that is different from the emitting ultrasonic sensor.

Conclusions concerning an instantaneously detected object may be drawn based on known back-reflection cross sections of reference objects. In particular, for a nonstatic distance of the instantaneously detected object from the transceiver unit, conclusions concerning the nature of the detected object detected at that moment may be drawn based on the known behavior of a reference object.

However, there may also be only a single echo for an object, for which the method is likewise applicable. Conclusions may be drawn concerning the reflection cross section of the object by normalization.

According to one specific embodiment, it is provided that a sequence of echo amplitudes of ultrasonic pulses emitted in chronological succession is received after reflection on an object, and the sequence of normalized echo amplitudes computed therefrom is analyzed for ascertaining the significance of the object. The normalization assists here in "eliminating" the distance-dependent component. This results in a reflection pattern that may be assessed as an object-specific "fingerprint."

In one refinement, it may be provided that the method encompasses a step of comparing the sequence of computed normalized echo amplitudes for various reference objects for ascertaining the significance of the object. In particular, it may be provided that, as described, for various reference objects it is ascertained whether this is the same or a similar object.

The echo amplitude is a function of numerous factors. On the one hand, the echo amplitude is a function of the distance of the object from the transceiver unit. On the one hand, the echo amplitude is also a function of the back-reflection cross section of the object, so that the back-reflection cross section for a very narrow, thin object, for example, is much smaller than for a thick, large object. In addition, the echo amplitude is a function of the type of surface of the object, so that fewer losses from absorption and scattering are to be expected for smooth surfaces. The structure of the object may also have an effect on the echo amplitude, for example due to interference effects.

As a result, the reference echo amplitude that is used must be appropriately selected, in particular corresponding to the expected conditions. The reference object may be situated on a main axis of the sensor. According to one specific embodiment, the reference object is selected from the group made up of geometric figures such as a tube, a vertical wall, or a sphere. A tube may particularly be used.

The tube may have a diameter of 30 mm to 30 cm, more particularly 50 mm to 5 cm, even more particularly 50 mm to 100 mm, in particular approximately 75 mm.

For objects such as a vehicle, for example, an echo pattern is obtained that involves a sequence of echoes with different normalized amplitudes. In refinements of the present invention, these known echo patterns are stored, i.e., retrievably stored. Newly measured echo patterns may be compared to the known echo patterns. A classification is thus obtained, and based on the obtained findings it may also be possible to control the behavior of a vehicle, for example to avert hazardous situations.

Echo amplitudes are also a function of the surroundings conditions. The attenuation is a function of the echo distance traveled, so that information concerning temperature and humidity is also provided in the distance-dependent reference amplitude dependency. In particular, the absorption of the ultrasound in air is a function of the temperature, the air pressure, and the humidity, with humidity and temperature being dominant. The decrease in an echo amplitude is typically expressed in dB/m. At an air temperature of −20° C. and a humidity of 90% RH, this is typically 0.4 dB/m, and at +40° C. and 20% RH it is 2.2 dB/m. These large differences result in significant range differences. According to one specific embodiment, the reference echo amplitude of the reference object used in the method is therefore ascertained at standard conditions, for example at an air temperature of 22.5° C. and 40% relative humidity.

It may be provided that when the surroundings conditions are known, the sensor converts the normalized echo amplitudes to the instantaneously prevailing surroundings conditions. The instantaneously prevailing surroundings conditions are then transmitted beforehand from the ECU to the sensor. Alternatively, it may be provided to carry out a subsequent correction in the ECU.

Another aspect that affects the echo amplitudes is the directional characteristic of the sensor. This describes the angular dependency of the sound emission and the sensitivity of the sensor. The directional characteristic is at a maximum on the sensor main axis, and decreases at larger angles. However, this angular dependency is known, and may be subsequently corrected in the ECU.

The reference echo amplitudes may be stored in a local memory of the ultrasonic transceiver unit, so that they are available during operation of the ultrasonic transceiver unit. The reference echo amplitudes are advantageously stored in a table that is indexed with the object distance.

The received echo amplitude, to which a certain object distance has been assigned, is divided by a reference echo amplitude having the same or a similar object distance. In practice, "similar object distance" is understood to mean, for example, that there may be a small deviation from the object distance of the instantaneously detected object. This may be carried out very quickly in a table that is indexed with the object distance. Alternatively, it may be provided to interpolate between the supporting points.

The step of encoding may encompass logarithmization of the normalized echo amplitudes. The logarithmization is advantageous, since a high level of dynamics is to be expected in the evaluation of the amplitudes of the echo signals. It is thus taken into account that in the majority of the possible objects, the back-reflection cross sections vary greatly. In addition, this takes into account the fact that the decrease in the amplitude is generally polynomial, for example as l/x. Thus, even weak signals from remote objects may be adequately evaluated.

According to one specific embodiment, the step of logarithmization is carried out using a look-up table. The method may run virtually in real time with the aid of the table. It may be provided to interpolate between the supporting points.

According to one specific embodiment, the echo amplitudes are discretized as 6-bit values. The resulting data reduction is advantageous in particular in conjunction with the logarithmization of the echo amplitudes, and the system may be implemented in a network with a low data transmission rate, for example in a CAN bus of a vehicle.

In one specific embodiment of the method, objects in the surroundings of a vehicle are recognized.

According to another aspect of the present invention, a system for carrying out one of the above-described methods is provided which includes at least one transceiver unit that is configured for emitting ultrasonic pulses and receiving echo amplitudes, a first module that is configured for ascertaining object distances for received echo amplitudes, a second module that is configured for computing normalized echo amplitudes for the received echo amplitudes, a received echo amplitude with a certain object distance being divided by a reference echo amplitude for the same or a similar object distance, and a third module that is configured for encoding the normalized echo amplitudes and transmitting them to a control unit.

The system is configured for carrying out one of the methods described herein. Therefore, the features described within the scope of one of the methods correspondingly apply for the system, and conversely, features described within the scope of the system correspondingly apply for the methods.

In principle, everything may be computed by corresponding modules in the control unit. However, this requires long computing times, and would also require an accurate ascertainment of the measured amplitudes.

Therefore, the following may be computed in the transceiver unit:

a) distance-dependent normalization as described above.

The following is carried out either in the transceiver unit or in the control unit:

b) the correction of the surroundings conditions. Taking the surroundings conditions into account in the transceiver unit presumes that they are known. Accordingly, in these specific embodiments, communication of the surroundings conditions from the control unit to the transceiver unit is provided.

c) significance computation.

d) classification based on the echo pattern.

Only the control unit computes the following:

e) the correction of the directional characteristic. The angular specification may be computed in the overall system.

According to the present invention, a computer program is also provided, according to which, one of the methods described herein is carried out when the computer program is executed on a programmable computer device. Portions of the computer program, in particular the computation of normalized echo amplitudes and the encoding of the normalized echo amplitudes, may be carried out by a microcontroller of an ultrasonic transceiver unit, and other portions may be carried out on an associated control unit (ECU). The computer program may be, for example, a module for implementing a driving assistance system or a subsystem thereof in a vehicle. The computer program may be stored on a machine-readable memory medium, such as a permanent or rewriteable memory medium, or in association with a computer device or on a removable CD-ROM, DVD, Blu-ray disk, or USB stick. Additionally or alternatively, the computer program may be provided on a computer device such as a server for downloading, for example in a data network such as the Internet or a communication link such as a telephone line or a wireless connection.

According to yet another aspect of the present invention, a vehicle with a driving assistance system that includes such a system is provided.

The driving assistance system may be configured as a parking assistant, for example, with which parking facilities in the surroundings of the vehicle are ascertained and the vehicle is optionally guided into one of the ascertained parking spaces. Further design options include, for example, a blind spot assistant that warns a driver of the vehicle of objects in the blind spot, or a backup assistant that assists the driver when backing up the vehicle.

In the provided method for recognizing objects using ultrasonic signals, not only is the object distance for a sequence of echo amplitudes ascertained, but also conclusions may be drawn concerning the type of object that has been detected. In particular, conclusions may be drawn concerning the geometry of the object or even the nature of the object, for example whether a vehicle or a person has been detected.

The method requires only a predetermined database with echo amplitudes of one or multiple reference objects at varying object distances, which may be stored in a memory of the ultrasonic transceiver unit. In the case of implementation using a table, the actual comparison requires only a few computation steps.

The method may also be advantageously used on narrowband bus systems such as a CAN bus when logarithmization and quantization of the echo amplitudes are carried out prior to the transmission from the ultrasonic transceiver unit to the control unit.

Exemplary embodiments of the present invention are explained in greater detail in the drawings and in the following description.

BRIEF DESCRIPTION OF THE DRAWINGS

FIG. 2 shows a diagram with the distance dependency of the echo amplitude of various objects.

DETAILED DESCRIPTION

Figure 1:
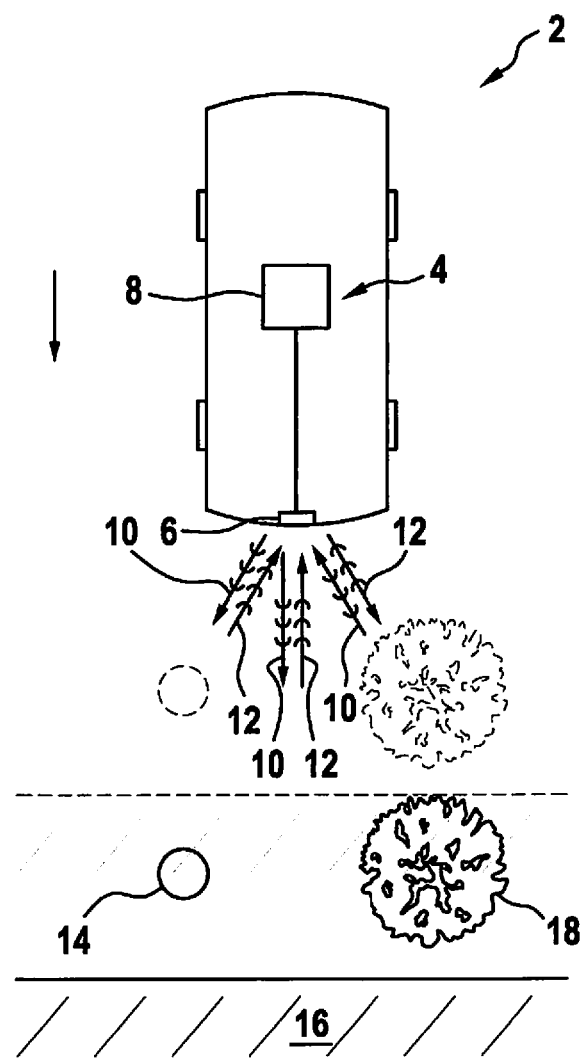
FIG. 1 shows a situation with a vehicle that includes a system according to the present invention, and with three objects in the surroundings of the vehicle.

FIG. 1 schematically illustrates a vehicle 2 with a driving assistance system 4 according to the present invention. Driving assistance system 4 includes a transceiver unit 6 and a control unit 8.

Transceiver unit 6 may include one or multiple ultrasonic converters with the aid of which the surroundings of vehicle 2 may be detected. For this purpose, transceiver unit 6 emits transmission signals in the form of ultrasonic pulses 10 and receives reception signals that are reflected from objects 14, 16, 18, and which within the scope of the present disclosure are also referred to as echo amplitudes 12.

The distances of objects 14, 16, 18 from transceiver unit 6 may be ascertained by run time analysis. For ultrasonic pulses 10 that are emitted in chronological succession, upon reflection on the same object 14, 16, 18 this results in a sequence of echo amplitudes 12 that is detected by transceiver unit 6.

Corresponding to a typical traffic situation, vehicle 2 approaches objects 14, 16, 18. The position of objects 14, 16, 18 at a later point in time is illustrated by dashed lines. The distances of transceiver unit 6 from the particular objects 14, 16, 18 have thereby decreased.

Object 14 is a narrow circular object such as a lamppost or the like. The distance dependency of the echo amplitude for this object is ascertained as $1/r^{1.5}$ at standard conditions of 22.5° C. and 40% relative humidity, where r denotes the distance, which is illustrated as curve $K_1$ in FIG. 2.

Object 16 is a vertical wall, for example a garage door, which vehicle 2 is driving toward. The vertical wall results in a distance dependency of $1/r$ at standard conditions of 22.5° C. and 40% relative humidity, illustrated as curve $K_2$ in FIG. 2.

Third object 18 is a bush, which may have a diffuse back-reflection characteristic.

When an ultrasonic pulse 10 is emitted, in the illustrated situation an echo amplitude 12 results for each of the three objects 14, 16, 18, and is examined when the method according to the present invention is carried out. Initially the particular object distance of echo amplitude 12 is determined from the run time of the echo signal.

A reference echo amplitude of a reference object at the same or similar object distance is subsequently ascertained, and normalized echo amplitudes for detected echo amplitudes 12 are computed by dividing received echo amplitudes 12 by the reference echo amplitude. The normalized echo amplitudes are logarithmized, discretized, and transmitted to control unit 8.

Even from a single normalized echo amplitude, control unit 8 obtains first pieces of information concerning the object. Object 16, the vertical wall, has a significant larger reflection cross section than object 14, the tube.

If the reference object is a tube, for example, for object 14 the normalized echo amplitude will be essentially constant. It may thus be inferred that object 14 matches the reference object or is very similar to it. In contrast, for object 16, the vertical wall, the echo amplitude will not be constant, from which it may be inferred that this is not a tube, but instead is a larger object. Similar conclusions may be drawn for third object 18, the bush.

Control unit 8 typically obtains a chronological sequence of normalized, encoded echo amplitudes, and from them further ascertains the significance of detected object 14, 16, 18.

The present invention is not limited to the exemplary embodiments described here and the aspects highlighted therein. Rather, numerous modifications within the range set forth in the claims are possible which are within the scope of activities carried out by those skilled in the art.

The invention claimed is:

1. A method for operating an ultrasonic measuring device, the method comprising:
    receiving echo amplitudes;
    ascertaining object distances for the received echo amplitudes;
    computing normalized echo amplitudes for the received echo amplitudes, a received echo amplitude with a certain object distance being divided by a reference echo amplitude for the same or a similar object distance;
    encoding the normalized echo amplitudes; and
    transmitting the encoded echo amplitudes to a control unit,
    wherein the reference echo amplitude is stored in a local memory of the ultrasonic measuring device, and the received echo amplitudes are compared to the stored reference echo amplitude.

2. The method of claim 1, wherein a sequence of echo amplitudes of ultrasonic pulses emitted in chronological succession is received after reflection on an object, and the sequence of normalized echo amplitudes computed therefrom is analyzed for ascertaining the significance of the object.

3. The method of claim 2, further comprising:
    comparing the sequence of computed normalized echo amplitudes for various reference objects for ascertaining the significance of the object.

4. The method of claim 1, wherein a reference object on which the reference echo amplitude is based on one of a tube, a vertical wall, or a sphere.

5. The method of claim 1, wherein the encoding encompasses logarithmization of the normalized echo amplitudes.

6. The method of claim 5, wherein the logarithmization is performed using a table.

7. The method of claim 1, wherein the echo amplitudes are discretized as 6-bit values.

8. A system for operating an ultrasonic measuring device, having at least one transceiver unit for emitting ultrasonic pulses and receiving echo amplitudes, comprising:
- a first module for ascertaining object distances for received echo amplitudes;
- a second module for computing normalized echo amplitudes for the received echo amplitudes, a received echo amplitude with a certain object distance being divided by a reference echo amplitude for the same or a similar object distance; and
- a third module for encoding the normalized echo amplitudes and transmitting them to a control unit,
- wherein the reference echo amplitude is stored in a local memory of the ultrasonic measuring device, and the received echo amplitudes are compared to the stored reference echo amplitude.

9. A vehicle, comprising:
- a driving assistance system for operating an ultrasonic measuring device, having at least one transceiver unit for emitting ultrasonic pulses and receiving echo amplitudes, including:
  - a first module for ascertaining object distances for received echo amplitudes;
  - a second module for computing normalized echo amplitudes for the received echo amplitudes, a received echo amplitude with a certain object distance being divided by a reference echo amplitude for the same or a similar object distance; and
  - a third module for encoding the normalized echo amplitudes and transmitting them to a control unit,
  - wherein the reference echo amplitude is stored in a local memory of the ultrasonic measuring device, and the received echo amplitudes are compared to the stored reference echo amplitude.

10. A non-transitory computer readable medium having a computer program, which is executable by a processor, comprising:
- a program code arrangement having program code for operating an ultrasonic measuring device, by performing the following:
  - receiving echo amplitudes;
  - ascertaining object distances for the received echo amplitudes;
  - computing normalized echo amplitudes for the received echo amplitudes, a received echo amplitude with a certain object distance being divided by a reference echo amplitude for the same or a similar object distance;
  - encoding the normalized echo amplitudes; and
  - transmitting the encoded echo amplitudes to a control unit;
- wherein the reference echo amplitude is stored in a local memory of the ultrasonic measuring device, and the received echo amplitudes are compared to the stored reference echo amplitude.

\* \* \* \* \*